United States Patent
Gao et al.

(10) Patent No.: US 11,327,146 B2
(45) Date of Patent: May 10, 2022

(54) METHOD, DEVICE AND COMPUTER-READABLE MEDIUM FOR DETERMINING LOCATION OF COMMUNICATION DEVICE

(71) Applicant: Alcatel Lucent, Nozay (FR)

(72) Inventors: Fei Gao, Shanghai (CN); Chaojun Xu, Shanghai (CN); Gang Shen, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/754,987

(22) PCT Filed: Oct. 9, 2018

(86) PCT No.: PCT/IB2018/001383
§ 371 (c)(1),
(2) Date: Apr. 9, 2020

(87) PCT Pub. No.: WO2019/073305
PCT Pub. Date: Apr. 18, 2019

(65) Prior Publication Data
US 2021/0199746 A1    Jul. 1, 2021

(30) Foreign Application Priority Data
Oct. 11, 2017 (CN) .......................... 201710943003.2

(51) Int. Cl.
*G01S 5/02* (2010.01)
*H04B 7/04* (2017.01)
*H04W 64/00* (2009.01)

(52) U.S. Cl.
CPC .............. *G01S 5/0273* (2013.01); *H04B 7/04* (2013.01); *H04W 64/00* (2013.01); *H04W 64/006* (2013.01)

(58) Field of Classification Search
CPC ... H04W 64/00; H04W 64/003; H04W 4/023; H04W 4/33; H04W 16/28; H04W 4/02;
(Continued)

(56) References Cited

U.S. PATENT DOCUMENTS 9,706,514 B2 * 7/2017 Silverman ............. G01S 5/0273
2009/0258622 A1 * 10/2009 Ruijter ................. H04B 7/0814
455/226.3
(Continued)

FOREIGN PATENT DOCUMENTS

| CN | 103702414 A | 4/2014 |
| CN | 104105198 A | 10/2014 |
| CN | 107241698 A | 10/2017 |
| EP | 3 185 031 A1 | 6/2017 |

(Continued)

OTHER PUBLICATIONS

International Search Report for PCT/IB2018/001383 dated Feb. 25, 2019.

*Primary Examiner* — Golam Sorowar
(74) *Attorney, Agent, or Firm* — Fay Sharpe LLP (57) ABSTRACT

Embodiments of the present disclosure relate to a method, a device and a computer readable medium for determining a location of a communication device. According to the embodiments of the present disclosure, a network device determines a location of a terminal device relative to a network device using signals received from the terminal device via a reference antenna and a switchable antenna array, thereby improving precision of determining the location of the terminal device.

17 Claims, 6 Drawing Sheets

(58) Field of Classification Search
CPC ... H04W 64/006; H04W 24/08; H04W 4/021; H04W 72/042; H04W 88/085; H04W 16/20; H04W 24/10; H04W 4/40; H04W 4/60; H04W 56/0015; H04W 72/0413; H04W 84/12; H04W 4/80; H04W 88/08; H04B 7/0413; H04B 7/0617; H04B 17/318; H04B 7/0452; H04B 7/0626; H04B 7/024; H04B 7/04; H04B 7/0456; H04B 10/25752; H04B 7/06; H04B 7/086; H04B 17/12; H04B 17/14; H04B 7/0619; H04B 7/063; H04B 17/345; H04B 7/0408; H04B 7/0417; H04B 7/0639; H04B 7/10; H04L 5/0048; H04L 5/0023; H04L 25/0204; H04L 5/0053; H04L 27/2613; H04L 5/001; H04L 5/0035; H04L 5/0051; H04L 5/0091; H04L 69/22; H04L 1/0038; H04L 1/0067; H04L 1/1812; H04L 25/02; H04L 25/03; H04L 5/0007; H04L 67/12; H04L 25/0212; H04L 25/0222; H04L 25/0224

See application file for complete search history.

(56) References Cited

U.S. PATENT DOCUMENTS

| | | | |
|---|---|---|---|
| 2013/0344815 A1* | 12/2013 | Cahill | H04B 17/27 |
| | | | 455/67.13 |
| 2016/0157201 A1 | 6/2016 | Silverman et al. | |
| 2016/0277898 A1* | 9/2016 | Bengtsson | H04B 7/0413 |
| 2016/0286519 A1 | 9/2016 | Tzur et al. | |
| 2017/0131381 A1 | 5/2017 | Malik et al. | |
| 2017/0134083 A1* | 5/2017 | Kim | H04B 7/0456 |

FOREIGN PATENT DOCUMENTS

| | | |
|---|---|---|
| GB | 2 355 159 A | 4/2001 |
| WO | WO 2015/196800 A1 | 12/2015 |

\* cited by examiner

METHOD, DEVICE AND COMPUTER-READABLE MEDIUM FOR DETERMINING LOCATION OF COMMUNICATION DEVICE

FIELD

Embodiments of the present disclosure generally relate to a communication technology, and more specifically, to a method, a device and a computer-readable medium for determining a location of a communication device.

BACKGROUND

With the development of communication technologies, communication traffic is increased significantly. In order to deal with the growing communication traffic, fifth-generation (5G) mobile communication standards have been proposed in $3^{rd}$ Generation Partnership Project (3GPP). In the 5G communication system, localization of a communication device, in particular indoor localization of the communication device, has drawn lots of attention. Nowadays, 5G projects of some communication companies cover indoor navigation, high precision localization and sensing of actions of human, such as a heart rate and the like. Therefore, there arises a need of making further research on localization of a communication device in a 5G communication system.

SUMMARY

Generally, embodiments of the present disclosure relate to a method and a corresponding network device for resource allocation in a communication network.

In a first aspect, embodiments of the present disclosure provide a method of determining a location of a communication device. The method comprises: receiving a first set of signals from a terminal device via a first antenna of the network device; receiving a second set of signals from the terminal device via a second set of antennas of the network device, the first and the second sets of signals being transmitted simultaneously by the terminal device; determining, based on the first and the second sets of signals, channel information between the network device and the terminal device; and determining, based on the channel information, a location of the terminal device relative to the network device.

In a second aspect, embodiments of the present disclosure provide a network. A network device comprises: a first antenna; a second set of antennas; at least one processor; and a memory coupled to the at least one processor and storing therein an instruction, the instruction, when executed by the at least one processor, causing the network device to execute acts of: receiving a first set of signals from a terminal device via a first antenna of the network device; receiving a second set of signals from the terminal device via a second set of antennas of the network device, the first and the second sets of signals being transmitted simultaneously by the terminal device; determining, based on the first and the second sets of signals, channel information between the network device and the terminal device; and determining, based on the channel information, a location of the terminal device relative to the network device.

In a third aspect, embodiments of the present disclosure provide a network device. The network device comprises: a first antenna configured to receive a first set of signals from a terminal device; a second set of antennas configured to receive a second set of signals from the terminal device, the first and the second sets of signals being transmitted simultaneously by the terminal device; a processor, comprising: a processing module configured to: determine, based on the first and the second sets of signals, channel information between the network device and the terminal device; and determine, based on the channel information, a location of the terminal device relative to the network device.

In a fourth aspect, embodiments of the present disclosure provide a computer readable storage medium. The computer readable storage medium includes a program code storing thereon, and the program code, when executed, causing the device to execute the method according to the first aspect.

It should be understood that this Summary is not intended to identify key features or essential features in the embodiments of the present disclosure, nor is it intended to be used to limit the scope of the present disclosure. Other features of the present disclosure will be made apparent by the following description.

BRIEF DESCRIPTION OF THE DRAWINGS

The above and other objectives, features and advantages of example embodiments of the present disclosure will become more apparent, through the following detailed description with reference to the accompanying drawings in which.

Throughout the drawings, the same or similar reference symbols refer to the same or similar elements.

DETAILED DESCRIPTION OF EMBODIMENTS

Embodiments of the present disclosure will now be described in more detail with reference to the drawings. Although some embodiments of the present disclosure are illustrated in the drawings, it should be understood that the present disclosure may be implemented in various manners but should not be limited by the embodiments as described herein. By contrast, these embodiments are provided to understand the present disclosure more thoroughly and completely. It is to be understood that the drawings and embodiments of the present disclosure are provided only as examples and is not intended for limiting the scope disclosed herein in any manner.

The term "network device" used herein refers to any suitable entities or devices that can provide cells or coverage, through which the terminal devices can access the network or receive services. Examples of the network device, for example, include a base station. The term "base station" (BS) used herein can represent a node B (NodeB or NB), an evolution node B (eNode B or eNB), a remote radio unit (RRU), a radio frequency head (RH), a remote radio head (RRH), a relay, or low power nodes, such as pico base station or femto base station and so on.

The term "terminal device" or "user equipment" (UE) used herein refers to any entities or devices that can wirelessly communicate with the network devices or with each other. For example, the terminal device can comprise a mobile terminal (MT), a subscriber station (SS), a portable subscriber station (PSS), a mobile station (MS) or an access terminal (AT), the above devices mounted on vehicles, and machines or electric appliances having communication functions etc.

The term "comprises" and its variants are to be read as open-ended terms that mean "comprises, but is not limited to." The term "based on" is to be read as "based at least in part on." The term "one embodiment" is to be read as "at least one embodiment." The term "a further embodiment" is to be read as "at least a further embodiment." Other definitions, explicit and implicit, may be comprised below.

Figure 1:
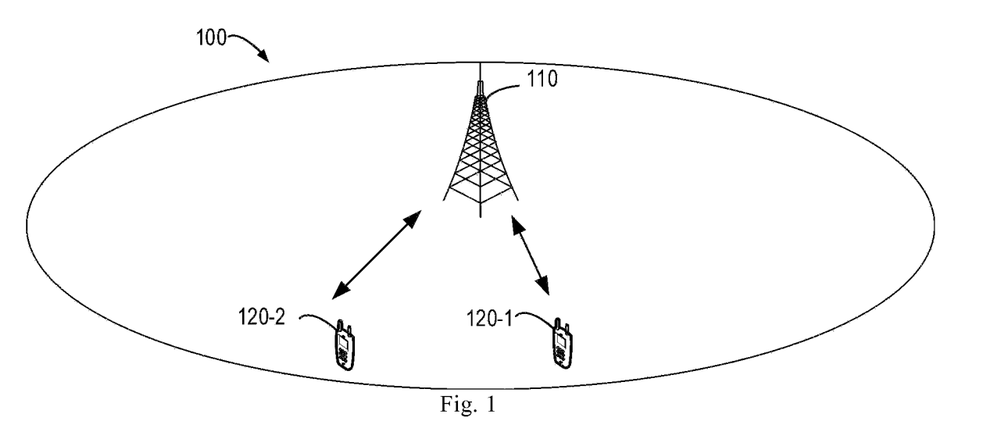
FIG. 1 illustrates a block diagram of an example communication system in which embodiments of the present disclosure may be implemented.

FIG. 1 illustrates an example communication system 100 in which embodiments of the present disclosure may be implemented. In the example, the communication system 100 comprises a network device 110 and terminal devices 120-1, 120-1 (which are collectively referred to as terminal device 120). It should be understood that the network device 140 as shown in FIG. 1 may be implemented at a base station, or may be implemented at a server of a cloud service. The numbers of the network devices and the terminal devices as shown in FIG. 1 are only provided for illustration without suggesting any limitation. The communication system may comprise any number of network devices or terminal devices. It should be understood that the communication system may comprise other devices not shown.

The communication in the communication system 100 may follow any appropriate wireless communication technology and a corresponding communication standard. Examples of the communication technology comprise, but are not limited to, new radio access technology, Long Term Evolution (LTE), LTE-advanced (LTE-A), wideband code division multiple access (W-CDMA), code division multiple access (CDMA), a global system for mobile communication (GSM), orthogonal frequency division multiplexing (OFDM), wireless local area networks (WLAN), worldwide interoperability for microwave access (WiMAX), Bluetooth, Zigbee technology, machine type communication (MTC), D2D, M2M or the like. Moreover, the communication may be performed according to any appropriate communication protocols which comprises, but is not limited to, a transmission control protocol (TCP)/internet protocol (IP), a hypertext transfer protocol (HTTP), a user datagram protocol (UDP), a session description protocol (SDP) and the like.

As described above, it is further required to study localization of a communication device in a 5G communication system. Typically, localization using an ultra wideband (UWB) technology can achieve a centimeter-level precision. However, since bandwidth of a communication device for example, a Wi-Fi device is limited (for example, 20 MHz), the localization of this type of the communication device can achieve a meter-level precision. In a case of multipath, the localization precision of this type of the communication device is probably only 15 meters. Therefore, antenna array and large antenna formulation based on synthetic aperture radar (SAR) are proposed for improving localization accuracy. However, there are still some pending problems in a legacy localization method based on the SAR technology. For example, it is required to mechanically rotate a communication device with a millimeter precision, far beyond what commercial accelerometers can provide. Although a technology allowing manually rotating a communication device has been proposed, the communication device should be rotated quickly in order to keep the channel flat, which is not practical in an actual application.

Figure 2:
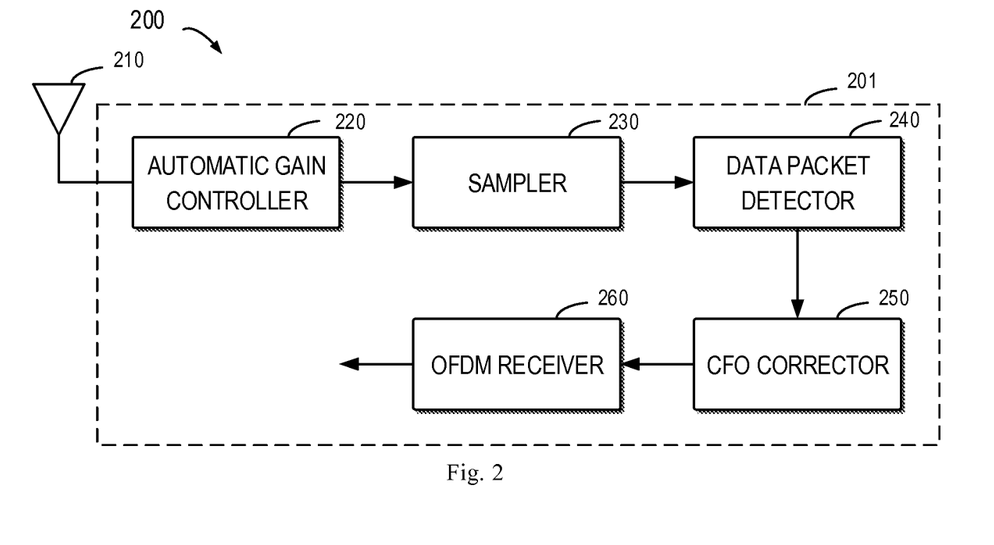
FIG. 2 illustrates an example block diagram of a signal receiving and processing procedure in legacy technologies.

Moreover, there is problem of errors during signal processing in the legacy localization method which is based on the SAR technology. FIG. 2 illustrates an example block diagram of a signal processing system 200 in the legacy technology. The block diagram of FIG. 2 comprises an antenna 210 and a digital signal processing section 201. The digital signal processing section 201 may comprise: an automatic gain controller (AGC) 220, a sampler 230, a data packet detector 240, a center frequency compensation (CFO) corrector and an orthogonal frequency division multiplexing (OFDM) receiver. In a procedure of processing signals received by the antenna 210, due to a change of signal amplitude, there may be an amplitude error existed in the signal after being amplified by the AGC 220. A phase error may be generated by the sampler 230 in a sampling procedure. Likewise, all of the data packet detector 240, the CFO corrector 250 and the OFDM receiver 260 may introduce phase errors. In addition, the legacy localization method based on the SAR technology can hardly detect a slight movement. Hence, it is required to improve the legacy method of localizing a communication device, so as to further improve measurement precision.

In order to at least partly solve the above problem, the embodiments of the present disclosure provide a method of determining a location of a terminal device relative to a network device by receiving signals from the terminal device via a reference antenna and a switchable antenna array.

Figure 3:
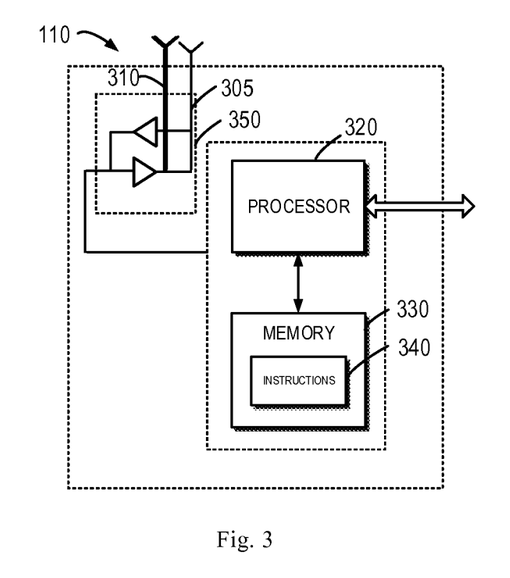
FIG. 3 illustrates a block diagram of a network device according to some embodiments of the present disclosure.

FIG. 3 illustrates a block diagram of a network device 110 according to embodiments of the present disclosure. As shown in FIG. 3, the network device 110 comprises one or more processors 320, one or more memories 330 coupled to the processor(s) 320, and one or more emitters and/or receivers 350 coupled to the processor(s) 320. The emitter and/or receiver 350 comprises: a first antenna 305; and a plurality of other antennas, collectively referred to as a "second set of antennas" 310. The second set 310 of antennas may comprise any number of homogeneous or heterogeneous antennas. The network device 110 may receive signals from the terminal device 120 via the first antenna 305 and the switchable second set of antennas 320 to determine a location of the terminal device 120 relative to the network device 110, thereby improving the precision of determining the location of the terminal device 120.

Specifically, the network device 110 receives a first set of signals from the terminal device 120 via the first antenna 305 and a second set of signals from the terminal device 120 via the second set 310 of antennas. The network device 110 determines, based on the first and the second sets of signals, channel information between the network device 110 and the terminal device 120, and determines, based on the channel information, the location of the terminal device 120 relative to the network device 110.

Figure 4:
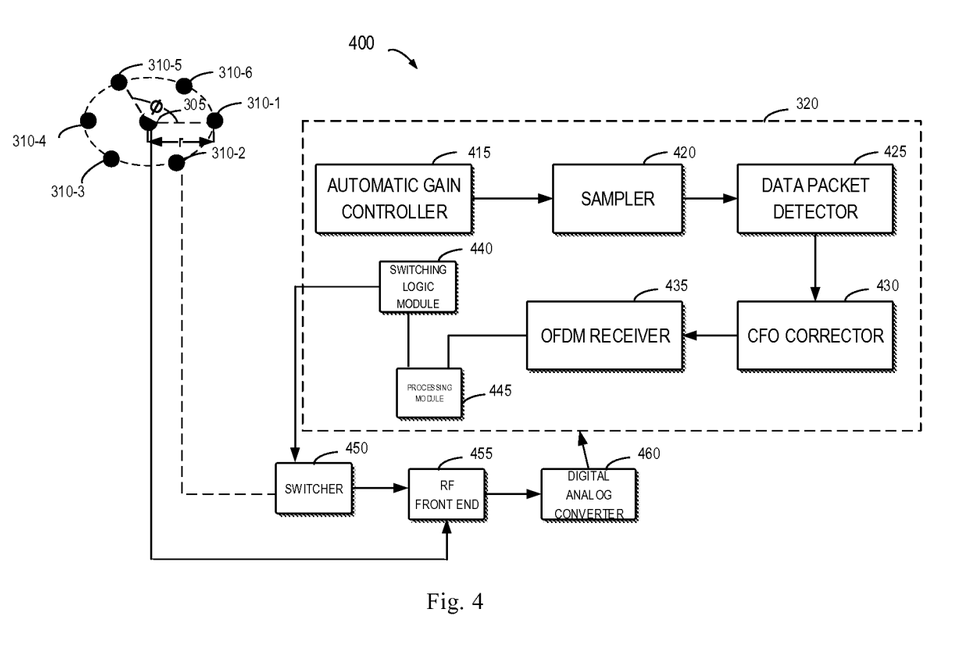
FIG. 4 illustrates an example block diagram of a signal receiving and processing procedure according to some embodiments of the present disclosure.

FIG. 4 illustrates an example block diagram of a system 400 according to some embodiments of the present disclosure. The system 400 is an example of the network device 110 as shown in FIG. 3. In the example, the second set 310 of antennas comprises an antenna 310-1, an antenna 310-2, an antenna 310-3, an antenna 310-4, an antenna 310-5 . . . and an antenna 310-N (where N is a natural number greater than 1). It should be understood that the respective numbers of the first antennas 305 and the second set 310 of antennas are only provided for illustration. For example, the second set of antennas may comprise any appropriate number of antennas. The number of the second set of antennas may be determined according to the needs of the localization precision. If a highly precise localization of the communication device is required, the second set of antennas may comprise more antennas. The antenna in the first antennas 305 and the second set 310 of antennas may be of any type. For example, in some embodiments, the first antennas 305 and the second set 310 of antennas may be omnidirectional antennas. The first antenna 305 and the second set 310 of antennas may be connected to a same reference clock.

In addition, the location arrangement of the first antenna 305 and the second set 310 of antennas, as shown in FIG. 4, are only provided as an example. For example, in some embodiments, the second set 310 of antennas may be arranged on a spherical surface with the first antenna 305 as a center. Only as an example, as shown in FIG. 4, the second set 310 of antennas may be equivalent to an annular antenna array, and the first antenna 305 may be located at a center of the second set 310 of antennas. In some embodiments, in order to reduce coupling with the second set 310 of antennas, the antenna 305 and the second set 310 of antennas may be at different planes. An effective radius between the first antenna 305 and the second set 310 of antennas is r. r may be of any appropriate value, for example a half of the wavelength of the received signal such that a distance between neighboring antenna units of the equivalent antenna array is a half of the signal wavelength. The antennas in the second set 310 of antennas may be distributed uniformly over the equivalent ring, or may be distributed non-uniformly.

For the purpose of illustration, in the context, the first antenna 305 serves as a coordinate origin, the connection between the first antenna 305 and the antenna 310-1 is at a horizontal direction (that is, an angle of the antenna 310-1 relative to the horizontal direction is 0°), an angle of Φ is formed between the horizontal direction and a connection connecting the other antennas in the second set of antennas and the first antenna 305, which may represent a location of the antenna of the second set of antennas in a spherical coordinate system with the first antenna 305 as the origin.

The system 400 may further comprise a processor 320 as shown in FIG. 3. The processor 320 may comprise: an automatic gain controller 415 for adjusting an amplitude of signals, a sampler 420 for sampling signals, a data packet detector 425, a CFO corrector 430 for correcting a center frequency, an OFDM receiver 435, a switch logical module 440 for controlling switch of antennas in the second set 310 of antennas, and a processing module 445 for further processing data packets. It should be understood that the components comprised in the processor 320 as shown in FIG. 4 are provided only as an example, which may comprise any other components associated with signal processing.

The system 400 may further comprise a switcher 450 for switching antennas in the second set 310 of antennas, a radio frequency (RF) frontend 455 and a digital analog converter 460. The switcher 450 may receive a command from the switch logical module 440 to switch antennas in the second set 310 of antennas. The system 400 may further comprise other components. For example, the system 400 may comprise a storage device which stores information related to switching of the second set 310 of antennas. The system 400 according to embodiments of the present disclosure is beneficial in the aspect of cost-saving.

Figure 5:
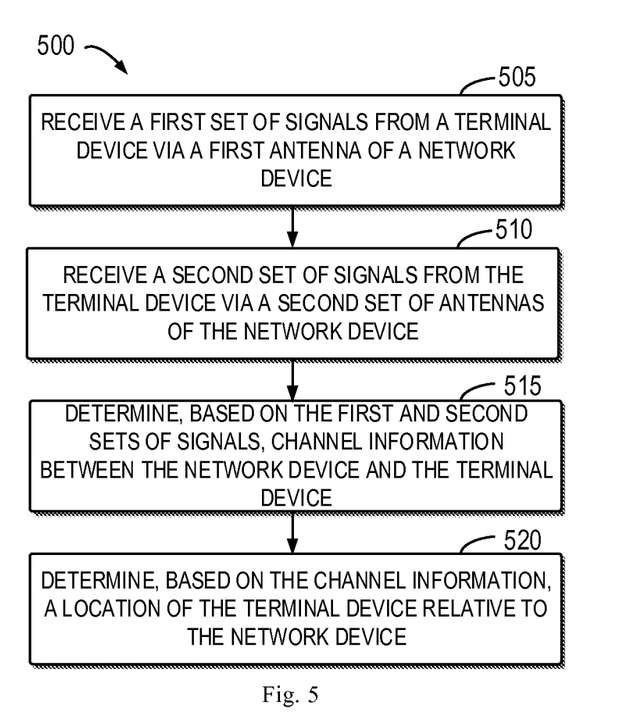
FIG. 5 illustrates a flowchart of a method according to some embodiments of the present disclosure.

FIG. 5 illustrates a flowchart of a method 500 according to some embodiments of the present disclosure. The method 500 may be implemented at the network device 110 as shown in FIG. 1. At block 505, the storage device 110 receives a first set of signals from the terminal device 120 via the first antenna 305.

At block 510, the network device 110 receives a second set of signals from the terminal device 120 via the second set 310 of antennas. Only as an example, in some embodiments, if the antenna 310-1 receives a second set of signals exceeding a predetermined period of time, the switching logic module 440 may notify the switcher 450 of switching to the antenna 310-6 for continuing to receive the second set of signals. The first and the second sets of signals are signals transmitted simultaneously by the terminal device 120 and received via different channels.

At block 515, the network device 110 determines channel information between the network device 110 and the terminal device 120 based on the first and the second sets of signals. In some embodiments, the channel information between the network device 110 and the terminal device 120 may be determined in the following manner. The first set of signals received via the first antenna 305 may be expressed through the following equation (1):

$$y_1(t)=h_1(t)e^{j\varphi(t)}x(t) \quad (1);$$

where $y_1(t)$ represents the first set of signals received by the network device 110 via the first antenna 305 at time t, x(t) represents a signal transmitted by the terminal device 120 at the time t, $h_1(t)$ represents a channel characteristic (for example, an amplitude of a channel response, phase information of a channel and the like) between the terminal device 120 and the network device 110 via the first antenna 305 at the time t, and $e^{j\varphi(t)}$ represents a phase error of the processor 320 introduced when processing the signal x(t) at the time t.

The second set of signals received via the second set 310 of antennas may be represented through the following equation (2):

$$y_2(t)=h_2(t)e^{j\varphi(t)}x(t) \quad (2);$$

where $y_2(t)$ represents the second set of signals received by the network device 110 via the second set 310 of antennas, at time t, x(t) represents a signal transmitted by the terminal device 120 at the time t, $h_2(t)$ represents a channel characteristic (for example, an amplitude of a channel response, phase information of the channel and the like) between the terminal device 120 and the network device 110 via the second set 310 of antennas, and $e^{j\varphi(t)}$ represents a phase error of the processor 320 introduced when processing the signal x(t) at the time t. Since the first and the second sets of signals pass through the same processor 320 and use jointly the same clock signal, the phase errors thereof are kept consistent.

A ratio of the channel characteristic between the terminal device 120 and the network device 110 via the second set 310 of antennas to the channel characteristic between the terminal device 120 and the network device 110 via the first antenna 305 may be expressed through the following equation (3):

$$h_{ref} = \frac{y_2(t)}{y_1(t)} = \frac{h_2(t)e^{j\varphi(t)}x(t)}{h_1(t)e^{j\varphi(t)}x(t)} = \frac{h_2(t)}{h_1(t)}; \quad (3)$$

where $h_{ref}$ represents a ratio of the channel characteristics of the two channels. Since $y_1(t)$ and $y_2(t)$ are known data for the network device 110, the network device 110 may determine $h_{ref}$. In this way, the phase error $e^{j\varphi(t)}$ introduced by the processor 320 is eliminated when processing the signal x(t) is eliminated, thus improving the precision of a location of the terminal device 120 determined by the network device 110.

Since the first antenna 305 is a static reference antenna, the channel characteristic between the terminal device 120 and the network device 110 via the first antenna 305 may be regarded as a constant for a certain time interval, that is, $h_1(t)$ is equal to) $h_1(0)$. $h_1(0)$ represents the channel characteristic between the terminal device 120 and the network device 110 via the first antenna 305 at an initial time. The network device 110 may determine information of the channel characteristic at the initial time by, for example, a channel information indicator received. Therefore, the network device 110 may determine the channel characteristic between the terminal device 120 and the network device 110 via the second set 310 of antennas through the following equation (4):

$$h_2(t) = h_{ref} h_1(t) = h_{ref} h_1(0) \quad (4).$$

In another embodiment, the network device 110 may determine in advance a phase error introduced by the processor 320 when processing a signal and store the phase error information in the storage device. The network device 110 may determine the channel information between the network device 110 and the terminal device 120, based on the phase error information, the first and the second sets of signals.

At block 520, the network device 110 determines, based on the channel information, the location of the terminal device 120 relative to the network device 110. In some embodiments, the network device 110 may determine an equivalent power distribution of the second set of signals over the second set of antennas, based on the channel information and the location of the second set 310 of antennas relative to the first antenna 305, and determine the location of the terminal device 120 relative to the network device 110 based on the power distribution. For example, the power distribution of the second set of signals may be determined through the following equation (5):

$$P(\theta, \Phi) = \left| \sum_t a_f(t, \theta, \Phi) h_2(t) \right|^2; \quad (5)$$

where $P(\theta, \varphi)$ represents a distribution of power of the second set of signals varying with an angle, $a_f(t, \theta, \Phi)$ represents a location of an antenna in the second set 310 of antennas at the time t, $\theta$ and $\Phi$ represent the location of the antenna in the second set of antennas in a spherical coordinate system with the first antenna 305 as a coordinate origin, $\theta$ used herein may be 90°, and $\Phi$ represents an angle of the connection between the antenna in the second set of antennas and the first antenna 305 relative to the horizontal direction. In some embodiments, the network device 110 may determine a direction of a greater power of the second set of signals, so as to determine the location of the terminal device 120.

It should be understood that the network device 110 may determine, based on the channel information, the location of the terminal device 120 relative to the network device 110 in any other appropriate manner. For example, the network device 110 may determine, based on the channel information, a signal having maximum amplitude in the second set of signals. The network device 110 may determine an antenna which receives the signal having the maximum amplitude in the second set 310 of antennas, based on pre-stored information on switching the antenna in the second set 310 of antennas, so as to determine the location of the terminal device 120.

Figure 6:
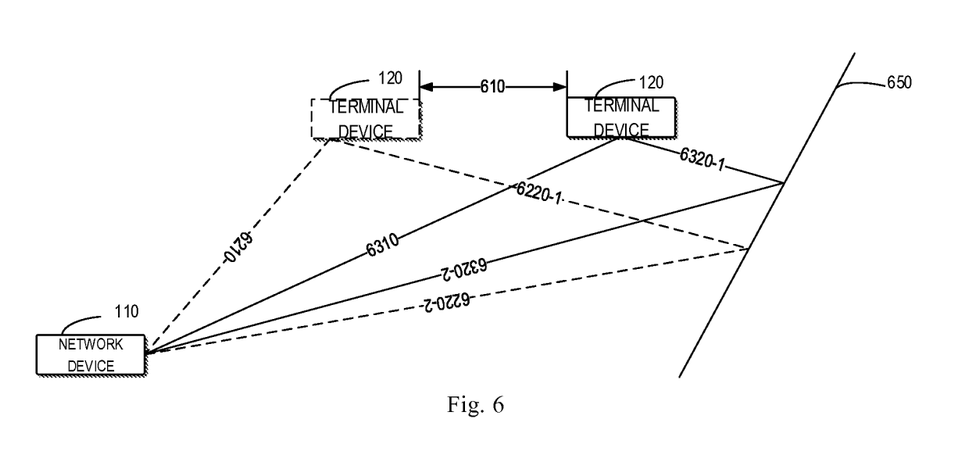
FIG. 6 illustrates a diagram according to some embodiments of the present disclosure.

FIG. 6 illustrates a diagram of determining a movement of a communication device according to implementation of the present disclosure. The terminal device 120 moves in a distance 610 from a first location to a second location. Only as an example, a transmission of the terminal device 120 at the first location to the network device 110 passes through a path 6210 and a path 6220, in which the path 6220 comprises two portions, namely a path 6220-1 and a path 6220-2 reflected by an obstacle 650. Transmission of the terminal device 120 at the second location to the network device 110 passes through a path 6310 and a path 6320, in which the path 6320 comprises two portions, namely a path 6320-1 and a path 6320-2 reflected by the obstacle 650. If the second set 310 of antennas is switched, the network device 110 may obtain a change of an angle of arrival (AOA) of the terminal device 120 when moving from the first location to the second location. If the terminal device 120 is far away from the network device 110, the angle change is too small to be measured, it thus may be regarded as that the path 6210 and the path 6310 have the same AOA, and as such, the signal change of the first antenna 305 may be regarded as being caused by the movement of the terminal device 120. Since the first antenna 305 is at a relative static state, the network device 110 may determine a movement distance 510 of the terminal device 120, based on different signals obtained from the first antenna 305 and the second set 310 of antennas. In this manner, the network device 110 may determine the location change of the terminal device 120 more precisely.

It should be understood that the embodiments of the present disclosure may be implemented by a processor 320 of the network device 110 executed by computer software, or hardware, or a combination of software and hardware. As discussed above, the network device 110 comprises one or more processors 320, one or memories 330 coupled to the processor(s) 320, and one or more transmitter and/or receivers 350 coupled to the processor(s) 320.

The processor 320 of the network device 110 may be of any appropriate type applicable to the local technical environment, and for example, without limitation, the processor 320 may comprise, but is not limited to, one or more general computers, dedicated computers, microprocessors, digital signal processors and processors based on multi-core processor architecture. The network device 110 may comprise a plurality of processors, such as dedicated integrated circuit chips which are temporally synchronous with a main processor.

The memory 330 may be of any appropriate type applicable to the local technical environment, and may be implemented using any appropriate data storage technique, including, but not limited to, a non-transient computer readable medium, a storage device based on a semiconductor, a magnetic storage device and system, and an optical storage device and system.

The memory 330 stores at least a part of instructions 340. The transmitter/receiver 350 may be applicable to bidirectional communication. The transmitter/receiver 350 comprises a first antenna 305 and a second set 310 of antennas. The transmitter/receiver 350 may support optical fiber communication, but in practice, there may be several access points as mentioned herein. The communication interface may represent any necessary interface communicating with other network elements.

The instructions 340 are assumed to comprise program instructions, which, when executed by the associated processor 320, cause the network device 110 to be operated according to the embodiments as described herein with reference to FIG. 5.

Generally, various embodiments of the present disclosure may be implemented in hardware or special purpose circuits, software, logic or any combination thereof some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

For example, embodiments of the present disclosure can be described in the general context of machine-executable instructions, such as those comprised in program modules, being executed in a device on a target real or virtual processor. Generally, program modules comprise routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would comprise an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of divide embodiments may also be implemented in combination in a single embodiment. Conversely, various features that are described in the context of a single embodiment may also be implemented in multiple embodiments dividedly or in any suitable sub-combination.

Although the subject matter has been described in language that is specific to structural features and/or methodological acts, it is to be understood that the subject matter defined in the appended claims is not limited to the specific features or actions described above. On the contrary, the above-described specific features and actions are disclosed as example forms of implementing the claims.

We claim:

1. A communication method implemented at a network device, comprising:
receiving a first set of signals from a terminal device via a first antenna of the network device;
receiving a second set of signals from the terminal device via a second set of antennas of the network device, the first and the second sets of signals being transmitted simultaneously by the terminal device;
determining, based on the first and the second sets of signals, channel information between the network device and the terminal device; and
determining, based on the channel information, a location of the terminal device relative to the network device,
wherein determining the location of the terminal device relative to the network device comprises:
determining, based on the channel information and a location of the second set of antennas relative to the first antenna, an equivalent power distribution of the second set of signals over the second set of antennas; and
determining, based on the equivalent power distribution, the location of the terminal device relative to the network device.

2. The communication method of claim 1, wherein the second set of antennas at least comprises a second antenna and a third antenna, and receiving the second set of signals from the terminal device comprises:
in response to receiving the second set of signals via the second antenna exceeding a predetermined period of time, switching to the third antenna for continuing to receive the second set of signals.

3. The communication method of claim 1, wherein determining the channel information between the network device and the terminal device comprises:
determining, based on the first and the second sets of signals, phase information and amplitude information of a channel response between the network device and the terminal device.

4. The communication method of claim 1, wherein the second set of antennas is an annular antenna array.

5. A network device, comprising:
a first antenna;
a second set of antennas;
at least one processor; and
at least one memory including computer program code;
the at least one memory and the computer program code configured to, with the at least one processor, cause the network device at least to perform:
receiving a first set of signals from a terminal device via a first antenna of the network device;
receiving a second set of signals from the terminal device via a second set of antennas of the network device, the first and the second sets of signals being transmitted simultaneously by the terminal device;
determining, based on the first and the second sets of signals, channel information between the network device and the terminal device; and
determining, based on the channel information, a location of the terminal device relative to the network device,
wherein determining the location of the terminal device relative to the network device comprises:
determining, based on the channel information and a location of the second set of antennas relative to the first antenna, an equivalent power distribution of the second set of signals over the second set of antennas; and
determining, based on the equivalent power distribution, the location of the terminal device relative to the network device.

6. The network device of claim 5, wherein the second set of antennas at least comprises a second antenna and a third antenna, and receiving the second set of signals from the terminal device comprises:
in response to receiving the second set of signals via the second antenna exceeding a predetermined period of time, switching to the third antenna for continuing to receive the second set of signals.

7. The network device of claim 5, wherein determining the channel information between the network device and the terminal device comprises:
determining, based on the first and the second sets of signals, phase information and amplitude information of a channel response between the network device and the terminal device.

8. The network device of claim 5, wherein the second set of antennas is an annular antenna array.

9. A network device, comprising:
a first antenna configured to receive a first set of signals from a terminal device;
a second set of antennas configured to receive a second set of signals from the terminal device, the first and the second sets of signals being transmitted simultaneously by the terminal device;
at least one processor
at least one memory including computer program code;
the at least one memory and the computer program code configured to, with the at least one processor, cause the network device at least to perform:
determining, based on the first and the second sets of signals, channel information between the network device and the terminal device; and
determining, based on the channel information, a location of the terminal device relative to the network device,
determining, based on the channel information and a location of the second set of antennas relative to the first antenna, an equivalent power distribution of the second set of signals over the second set of antennas; and
determining, based on the equivalent power distribution, the location of the terminal device relative to the network device.

10. The network device of claim 9, wherein the second set of antennas comprises at least a second antenna and a third antenna, and the at least one memory and the computer program code are configured to, with the at least one processor, cause the network device at least to perform:
in response to receiving the second set of signals via the second antenna exceeding a predetermined time, switching to the third antenna for continuing to receive the second set of signals.

11. The network device of claim 9, wherein the at least one memory and the computer program code are configured to, with the at least one processor, cause the network device at least to perform:
determining, based on the first and the second sets of signals, phase information and amplitude information of a channel response between the network device and the terminal device.

12. The network device of claim 9, wherein the second set of antennas is an annular antenna array.

13. The network device of claim 9, wherein the first antenna comprises a static reference antenna.

14. The network device of claim 9, wherein the second set of antennas comprises a switchable antenna array.

15. The network device of claim 9, wherein the first antenna comprises a static reference antenna and the second set of antennas comprises a switchable antenna array.

16. The network device of claim 15, wherein the first antenna and the second set of antennas are connected to a same reference clock.

17. A non-transitory computer readable medium comprising program instructions for causing an apparatus to perform at least the method of claim 1.

* * * * *